Jan. 23, 1934.   O. A. WIBERG ET AL   1,944,536
STEAM TURBINE
Filed May 28, 1932   2 Sheets-Sheet 1
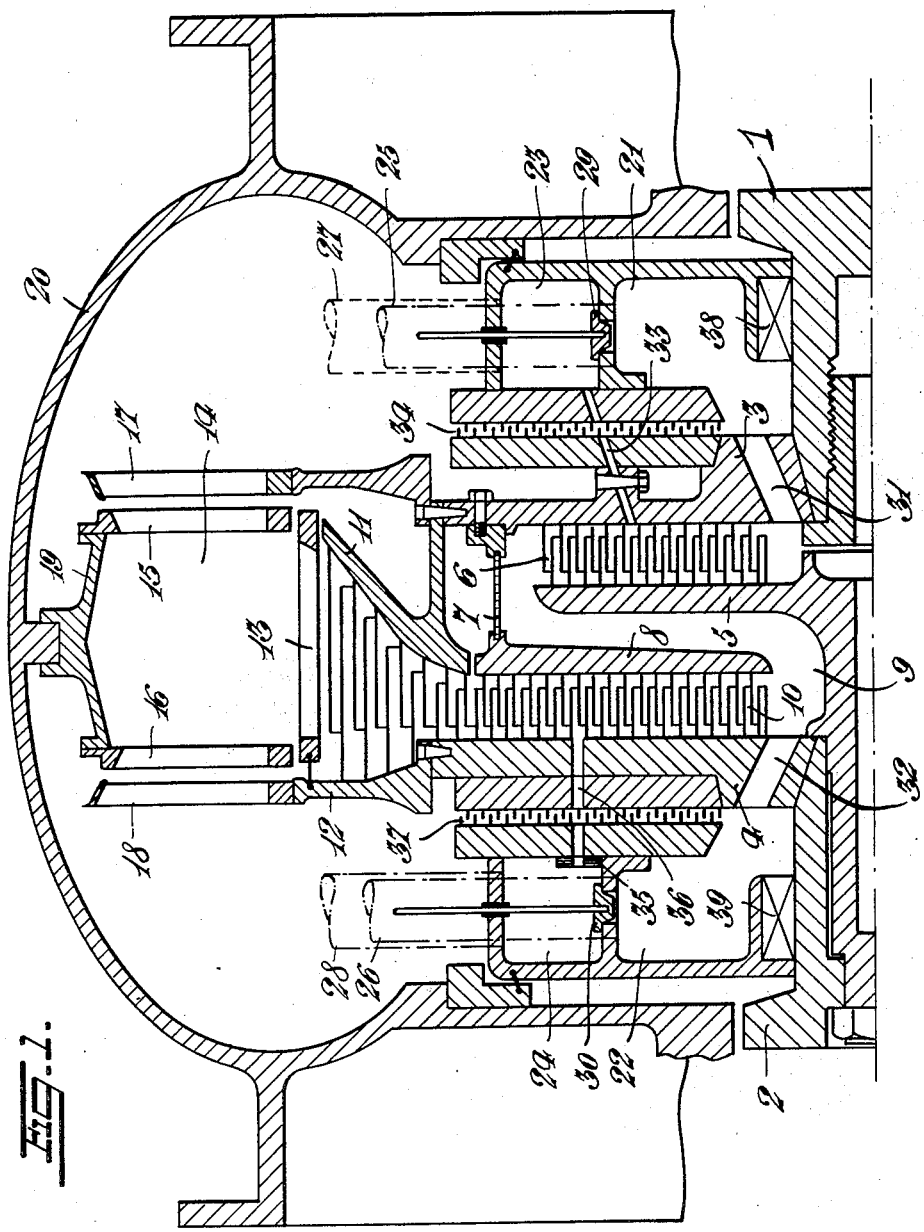
Inventors
Oscar A. Wiberg
Olov Möller
by Sommers & Young
attys

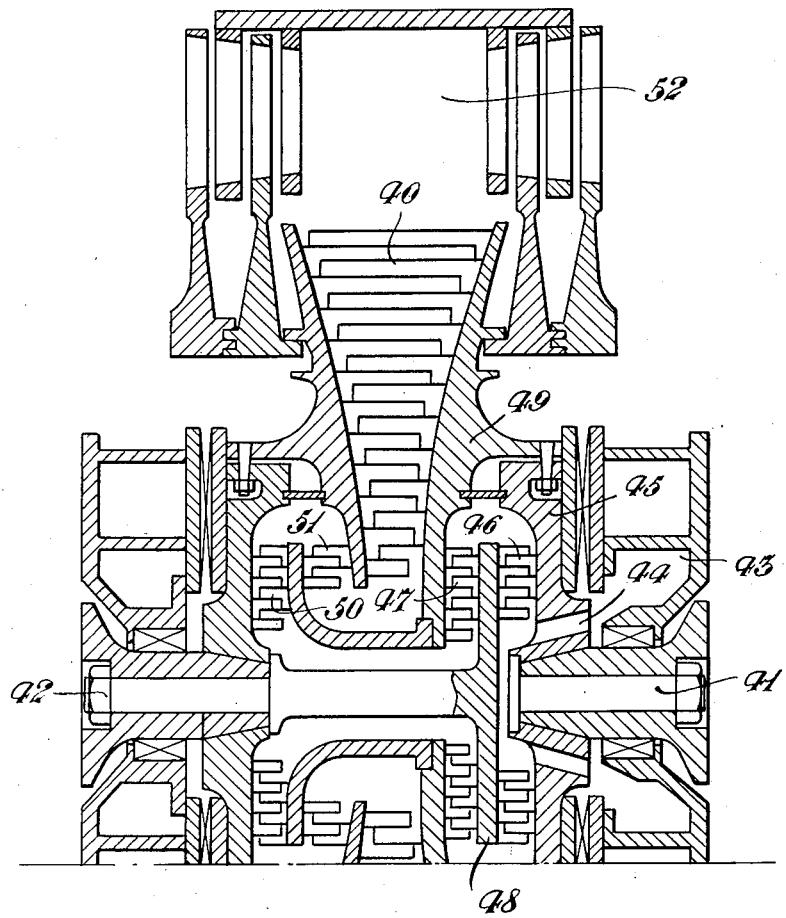

Patented Jan. 23, 1934

1,944,536

UNITED STATES PATENT OFFICE 1,944,536

STEAM TURBINE

Oscar Anton Wiberg and Olov Möller, Finspong, Sweden

Application May 28, 1932, Serial No. 614,190, and in Germany June 6, 1931

4 Claims. (Cl. 253—16.5)

In connection with radial flow steam turbines the steam pressure can only be chosen within very narrow limits, because of the fact that the fall of pressure on the way of the steam outwards takes place comparatively slowly so that already a very slight increase of the initial pressure will result in a comparatively great increase of way radial dimension of the turbine. Thus, diameters will soon be reached which cannot come into consideration when proper regard is paid to the strength of the material. The present invention has now for its object to provide a turbine which allows the use of considerably higher pressures on the fresh steam than those hitherto used, without requiring any increase of the diameter in an undue degree.

Reference is made to our copending application Serial Number 614,989 for Radial flow elastic fluid turbines, filed June 2, 1932.

One feature of the turbine forming the subject matter of this invention resides in that the radial flow turbine which may be provided with or not provided with expansion stages for axial admission is combined with one or more auxiliary bladings which are displaced axially with respect to the radial flow turbine as well as to each other, said auxiliary bladings being situated in series with the radial flow turbine, as far as the flow of the steam is concerned, in as much as the steam passes through the several bladings in succession either only outwards or alternately outwards and inwards.

In the accompanying drawings two embodiments of turbines constructed according to this invention are shown.

Fig. 1 is an axial longitudinal section of the upper half of a turbine having a single auxiliary blading. Fig. 2 is a similar section of a turbine having four auxiliary bladings.

Both of the figures relate to turbines having blades and discs rotating in opposite directions. With reference to Fig. 1, the numeral 1 indicates one turbine shaft and the numeral 2 indicates the other turbine shaft. Shaft 1 carries a turbine disc 3 and shaft 2 carries a turbine disc 4. Both shafts are arranged in overhanging relation to the bearings. The turbine disc 3 carries a set of blade rings which together with blade rings of a blade ring carrier or disc 5 constitute a blading 6 for radial admission. Supported at the outer periphery of disc 3 by means of a cylindrical connecting member 7 is an inwardly projecting disc 8. An inwardly extending connecting passage 9 is formed between the disc 8 and the disc 5. Carried by the disc 8 on the surface thereof remote from said passage 9 are rotary blade rings forming together with corresponding blade rings of the disc 4, a blading 10 for radial admission. The disc 3 also carries a turbine disc 11 which forms an extension of the disc 8, and similarly, the disc 4 carries an outer disc 12. Said discs 11 and 12 carry rotary blade rings forming a blading 13 surrounding the blading 10 the axial dimension of which increases considerably with increase of radius. Outside the blading 13 an annular chamber 14 is provided, the side walls of which are represented by expansion stages for axial admission. In the drawings, each such expansion stage comprises a stationary guide blade set 15, 16, respectively, and a rotary blade set 17, 18, respectively. The guide blade sets 15, 16 are connected at their outer periphery to the peripheral wall 19 of chamber 14 which is, in turn, connected to the turbine casing 20. The interior of said turbine casing 20 is in communication with a condenser, not shown.

The shafts 1 and 2 are each surrounded by a steam chest 21, 22, respectively, which are in their turn surrounded by chambers 23, 24, respectively, leading to the chambers or steam chests 21 and 22 are conduits 25, 26, and leading to the chambers 23 and 24 are conduits 27 and 28. Inserted between chambers 21 and 23 is a valve 29, and a similar valve 30 is inserted between the chambers 22 and 24. The steam chest 21 to which fresh steam of high pressure is admitted through conduit 25 communicates with the centre of blading 6 through openings 31 formed in the turbine disc 3. The steam chest 22 communicates through openings 32 in the disc 4 with the smallest diameter of the connecting passage 9. Provided between chamber 23 and an inner stage of the blading 6 is a continuously open connection provided by channels 33 which extend through a labyrinth packing 34 situated between the steam chest 21 and the turbine disc 3, as well as through the turbine disc 3 itself. Provided between chamber 24 and an inner stage of the blading 10 is a connection 36 controlled by an annular slide valve 35 which extends through a labyrinth packing 37 situated between steam chest 22 and turbine disc 4, as well as through the turbine disc 4 itself. Disposed between the steam chests 21 and 22 on the one hand and the shafts 1 and 2 on the other hand are packings 38 and 39.

The high pressure steam supplied through conduit 25 to the steam chest 21 passes through the openings 31 and then passes outwards through the blading 6 from the outer periphery of which the steam is again passed inwards through the passage 9 to be then allowed to expand in the blading 10 while flowing outwards therethrough. The steam may either pass exclusively through the blading 10 or partly through said blading and partly through the openings 32 into the chamber 22 to be discharged therefrom through conduit 26. With the valve 30 and the slide valve 35 in open state, part of the steam may be passed outside the inner part of the blading 10 parallel thereto and again admitted to said blading approximately at a point thereof intermediate between the inner and outer periphery of the blading. By means of the slide valve 35 steam of an intermediate pressure may be discharged in an adjustable way. Steam of an intermediate pressure may also be discharged from the blading 6 through the channels 33, chamber 23 and conduit 27. Furthermore, overload steam may be supplied to the chamber 23 by opening the valve 29. Said steam will then enter an inner stage of the blading 6 through said channels 33. It is to be noted that also in connection with the chamber 24 it is possible to admit high pressure steam, and the same possibility also exists as far as the chamber 22 is concerned.

Because the blading 10 is combined with an auxiliary blading 6 for radial admission which presents moderate radial dimension only, the steam supplied to the blading 6 may be of very high pressure, because of the fact that the steam before entering the blading 10 may be reduced as far as its pressure is concerned to an appropriate value. If desired, rotary blade rings may, of course, also be provided in the connecting passage 9 whereby a still greater fall of pressure may be caused to take place in front of the blading 10.

It is to be noted that in the embodiment above described one blading only is provided as auxiliary blading. In Fig. 2 four sets of rotary blade rings are shown as auxiliary bladings. One pair of auxiliary bladings which are all provided for radial admission is situated on the one side of the main blading 40, the other pair of auxiliary bladings being situated on the opposite side of said main blading. The two shafts are indicated by 41 and 42. The admission of the high pressure steam is effected from chamber 43 through openings 44 formed in a turbine disc 45 carried by the shaft 41 to the blading 46 through which the steam passes outwards to be then admitted to the blading 47 through which the steam passes radially inwards. Said blading 47 is situated between a blade ring carrier or disc 48 on the shaft 42 and a turbine disc 49 carried by the blade ring or disc 45 which forms one disc of the main blading 40. After the steam has passed through said blading 47 it will flow along the shaft 42 to enter the blading 50 situated at the opposite side of the main blading 40. The steam passes through said blading 50 outwards and is then transmitted to the blading 51 through which the steam passes inwards to then enter the main blading 40 at the inner periphery thereof. The steam discharged from the blading 40 at the outer periphery thereof is received by a chamber 52 which is provided with axial flow expansion stages on its opposite sides in which the last expansion of the steam takes place. It is to be noted that any desired number of auxiliary bladings for radial admissions may be provided in axial displacement with relation to each other and to a main blading whereby a correspondingly higher steam pressure may be used. The constructive form may be varied accordingly without departing from the principle of the invention.

In the embodiment shown in Fig. 2 appropriate means may be provided to permit the discharge of steam of intermediate pressure as well as to permit the admission of overload steam or in order to secure proper balance. The means required for these purposes are not shown in the drawings, as they may be constructed in various ways.

What we claim is:—

1. A steam turbine of the so-called Ljungström-type, comprising overhanging shaft ends adapted for rotation in opposite directions, a disc on each of the shaft ends, blade rings carried by said discs, and additional blade ring carriers with associated blade rings interposed in the space between said two discs so as to form together with the blade rings of the discs a set of axially displaced blading sections for radial admission in series, the said interposed carriers being connected to said discs in such a way that the blade ring carriers of one disc alternate in axial direction with the blade ring carriers of the other disc.

2. A steam turbine of the so-called Ljungström-type, comprising two overhanging shaft ends adapted for rotation in opposite directions, two oppositely positioned discs one on each of these shaft ends, blade rings carried by said discs, other blade ring carriers connected to said discs in the space between the discs, and blade rings on said carriers, the arrangement being such as to form a set of axially displaced blading sections in series, including a main section to be last passed by the steam which is of a substantially larger diameter than the other sections, the various blade ring carrying elements being so arranged with respect to each other that the elements belonging to one disc alternate in axial direction with the elements belonging to the other disc.

3. A steam turbine of the so-called Ljungström-type, comprising two overhanging shaft ends adapted for rotation in opposite directions, two oppositely positioned discs one on each of these shaft ends and blade rings carried by said discs and other blade carrying elements connected to said discs in the space between the discs so as to form a set of axially displaced blading sections in series, including a main section to be last passed by the steam which is of a substantially larger diameter than the other sections, the various blade carrying elements being so arranged with respect to each other that the elements belonging to one disc alternate in axial direction with the elements belonging to the other disc, and additional expansion stages for axial admission provided so as to be acted on by the exhaust steam discharged from said main blading section.

4. A steam turbine of the so-called Ljungström-type, comprising two overhanging shaft ends adapted for rotation in opposite directions, two oppositely positioned discs one on each of these shaft ends and blade rings carried by said discs and other blade carrying elements connected to said discs in the space between the discs so as to form a set of axially displaced blading sections in series, including a main section to be last passed by the steam which is of a substantially larger diameter than the other sections, the various blade carrying elements being so arranged with respect to each other that the elements belonging to one disc alternate in axial direction with the elements belonging to the other disc, the said interposed blade carrying elements being connected to said discs by means of expansion elements.

OSCAR ANTON WIBERG.
OLOV MÖLLER.